(12) United States Patent
Tran et al.

(10) Patent No.: US 8,706,065 B2
(45) Date of Patent: Apr. 22, 2014

(54) BLUETOOTH AND WLAN COEXISTENCE ARCHITECTURE HAVING A SHARED LOW NOISE AMPLIFIER

(75) Inventors: Ninh Tran, San Francisco, CA (US); Timothy Li, San Jose, CA (US); Gladys Yuen Yan Wong, Fremont, CA (US); George Lee, San Jose, CA (US); Todd Tokubo, Newark, CA (US); Ken Yeung, Cupertino, CA (US); Ronak Anjan Chokshi, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 3 days.

(21) Appl. No.: 13/448,899

(22) Filed: Apr. 17, 2012

(65) Prior Publication Data

US 2012/0201234 A1 Aug. 9, 2012

Related U.S. Application Data

(63) Continuation of application No. 12/405,594, filed on Mar. 17, 2009, now Pat. No. 8,165,544.

(60) Provisional application No. 61/037,560, filed on Mar. 18, 2008.

(51) Int. Cl.
*H04B 7/08* (2006.01)
*H04B 1/44* (2006.01)

(52) U.S. Cl.
USPC .......................................... 455/132; 455/78

(58) Field of Classification Search
USPC ............... 455/73, 78, 82, 550.1, 552.1, 553.1, 455/132
See application file for complete search history.

(56) References Cited

U.S. PATENT DOCUMENTS

| | | | |
|---|---|---|---|
| 8,055,230 B1* | 11/2011 | Bidichandani et al. | 455/232.1 |
| 8,165,544 B2* | 4/2012 | Tran et al. | 455/132 |
| 8,401,505 B1* | 3/2013 | Bidichandani et al. | 455/232.1 |
| 2004/0192222 A1 | 9/2004 | Vaisanen et al. | |
| 2006/0270449 A1 | 11/2006 | Kim et al. | |
| 2007/0207752 A1 | 9/2007 | Behzad | |
| 2007/0232358 A1 | 10/2007 | Sherman | |
| 2007/0275746 A1 | 11/2007 | Bitran | |

FOREIGN PATENT DOCUMENTS

| | | |
|---|---|---|
| CN | 2927564 Y | 7/2007 |
| WO | WO-2008/073180 | 6/2008 |

OTHER PUBLICATIONS

Search Report in EP Application No. 09722388.7 dated Jun. 1, 2012, 7 pages.
First Office Action in CN Application No. 200980109792.3 dated Sep. 28, 2012.

(Continued)

*Primary Examiner* — Dean O Takaoka

(57) ABSTRACT

A radio frequency front-end includes a first path, second path, and third path each coupled between an antenna and a transceiver. The first path is configured to convey WLAN signals from the transceiver to the antenna for transmission. The second path is configured to convey received Bluetooth signals and received WLAN signals from the antenna to the transceiver. The third path is configured to convey Bluetooth signals from the transceiver to the antenna for transmission when a WLAN link is active and not in a power save state, and is configured to convey received Bluetooth signals from the antenna to the transceiver, and Bluetooth signals from the transceiver to the antenna for transmission, when the WLAN link is either inactive or in the power save state.

21 Claims, 2 Drawing Sheets

(56) References Cited

OTHER PUBLICATIONS

Summary of Notice of Reasons for Rejection in JP Patent Application No. 2011-500910 dated Feb. 5, 2013, 3 pages.
International Preliminary Report on Patentability from corresponding International Application No. PCT/US2009/037441 dated Sep. 21, 2010.
International Search Report and Written Opinion from corresponding International Application No. PCT/US2009/037441 dated Jun. 16, 2009.
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHT) specifications: High-Speed Physical Layer in the 5 GHZ Band," *The Institute of Electrical and Electronics Engineers, Inc.*, (1999).
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
Notice of Reasons for Rejection in JP Patent Application No. 2011-500910 dated Oct. 22, 2013.
English-language translation of second Office Action in CN Application No. 200980109792.3 dated May 27, 2013.

\* cited by examiner

BLUETOOTH AND WLAN COEXISTENCE ARCHITECTURE HAVING A SHARED LOW NOISE AMPLIFIER

CROSS-REFERENCE TO RELATED APPLICATIONS

The present application is a continuation application of U.S. application Ser. No. 12/405,594, now U.S. Pat. No. 8,165,544, entitled "Bluetooth and WLAN Coexistence Architecture Having a Shared Low Noise Amplifier," filed on Mar. 17, 2009, which claims the benefit of U.S. Provisional Patent Application No. 61/037,560, filed on Mar. 18, 2008. The disclosures of the above-referenced applications are hereby incorporated by reference herein in their entireties.

BACKGROUND OF THE INVENTION

The increase in the number of handheld platforms in the recent years has created a need to integrate multiple wireless networking technologies on one communication integrated circuit (IC). Of these, the two most widely used wireless networking technologies are wireless local area network (WLAN) (a.k.a., Wi-Fi) and Bluetooth. WLAN and Bluetooth both occupy a section of the 2.4 GHz Industrial, Scientific, and Medical ("ISM") band.

Bluetooth is an industrial specification that can be used for wireless personal area networks ("PANs"). Bluetooth can be particularly useful when transferring information between two or more devices that are near each other in low-bandwidth situations. Bluetooth can be used to connect and exchange information between devices such as mobile phones, laptops, personal computers, hand-held computers, printers, digital cameras, and video game consoles. Common applications of Bluetooth can include wireless control of and communication between a mobile phone and a hands-free headset (e.g., a Bluetooth earbud), wireless networking between computers for certain applications, and wireless communications between a computer and input and output devices (e.g., mice, keyboards, and printers). Bluetooth uses Frequency Hopping Spread Spectrum ("FHSS") and is allowed to hop between 79 different 1 MHz-wide channels in the ISM band.

WLAN refers to wireless technology based upon the IEEE 802.11 standards generally used for local area networking. Common applications for WLAN include internet access and network connectivity for consumer electronics. WLAN generally uses the same radio frequencies as Bluetooth, but operates using higher power, generally resulting in a stronger connection that can cover a greater distance. WLAN uses Direct Sequence Spread Spectrum (DSSS) instead of FHSS. Its carrier does not hop or change frequency, and is instead maintained on one channel that is 22 MHz-wide. There is room for 11 overlapping WLAN channels in the ISM band, but there is only room for three non-overlapping channels. This means that no more than three different WLAN networks may operate in close proximity to one another.

Because both WLAN and Bluetooth wireless technology share spectrum and can often be located in close physical proximity to one another, there is a likelihood that some interference will occur. While WLAN and Bluetooth technology can continue to function during interference, increasing levels of interference can result in a slowing of the data rate as more packets need to be resent. In some conditions of extreme interference, communications can cease altogether.

Although both WLAN and Bluetooth use the same unlicensed 2.4 GHz ISM band, the link layer protocol used for communication over each of these two technologies is very different. This poses a difficult problem for designing integrated circuits (ICs) and external logic components that are capable of running link layer protocols for both WLAN and Bluetooth. In other words, in order for the end-user to use both WLAN and Bluetooth on the same device simultaneously, these two technologies are required to coexist with each other both in time and frequency. Among others, appropriate Time Division Duplex (TDD) and RF isolation techniques are sought after to resolve this problem.

BRIEF SUMMARY OF THE INVENTION

In one embodiment, a radio frequency (RF) front-end includes a first path coupled between an antenna and a transceiver. The first path is configured to convey WLAN signals from the transceiver to the antenna for transmission. The RF front-end also includes a second path coupled between the antenna and the transceiver. The second path is configured to convey received Bluetooth signals and received WLAN signals from the antenna to the transceiver. The RF front-end further includes a third path coupled between the antenna and the transceiver. The third path is configured to convey Bluetooth signals from the transceiver to the antenna for transmission when a WLAN link is active and not in a power save state, and convey received Bluetooth signals from the antenna to the transceiver, and Bluetooth signals from the transceiver to the antenna for transmission, when the WLAN link is either inactive or in the power save state.

In another embodiment, a method for facilitating Bluetooth and WLAN transmissions and receptions via a radio frequency (RF) front-end, wherein the RF front end comprises a first path coupled between an antenna and a transceiver, a second path coupled between the antenna and the transceiver, and a third path coupled between the antenna and the transceiver, includes conveying, over the first path, WLAN signals from the transceiver to the antenna for transmission. The method also includes conveying, over the second path, received Bluetooth signals and received WLAN signals from the antenna to the transceiver. The method further includes, conveying, over the third path, Bluetooth signals from the transceiver to the antenna for transmission when a WLAN link is active and not in a power save state, and received Bluetooth signals from the antenna to the transceiver, and Bluetooth signals from the transceiver to the antenna for transmission, when the WLAN link is either inactive or in the power save state.

In another embodiment, a method for facilitating Bluetooth and WLAN signals transmissions and receptions in an electronic device includes providing one or more control signals to a radio frequency (RF) front-end, transmitting WLAN signals via a first path coupled between an antenna and a transceiver, receiving WLAN signals and Bluetooth signals via a second path coupled between the antenna and the transceiver, and, based on the one or more control signals, either transmitting Bluetooth signals via a third path coupled between the antenna and the transceiver, or transmitting and receiving Bluetooth signals via the third path coupled between the antenna and the transceiver.

In another embodiment, an electronic device includes an antenna, a transceiver configured to provide one or more control signals to a radio frequency (RF) front-end, and the RF front-end. The RF front-end is configured to transmit WLAN signals via a first path coupled between the antenna and the transceiver, receive WLAN signals and Bluetooth signals via a second path coupled between the antenna and the transceiver, and, based on the one or more control signals, either transmit Bluetooth signals via a third path coupled between the antenna and the transceiver, or transmit and receive Bluetooth signals via the third path coupled between the antenna and the transceiver.

DETAILED DESCRIPTION OF THE INVENTION

The present invention relates to a coexistence architecture for WLAN and Bluetooth. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

The present invention is mainly described in terms of particular systems provided in particular implementations. For example, the system is described for use with wireless local area network (WLAN). However, this method and system may operate effectively in other implementations. For example, the systems, devices, and networks usable with the present invention can take a number of different forms, such as use with Wi-Max (Worldwide Interoperability for Microwave Access) technology. The present invention will also be described in the context of particular methods having certain steps. However, the method and system operate effectively for other methods having different and/or additional steps not inconsistent with the present invention.

Figure 1:
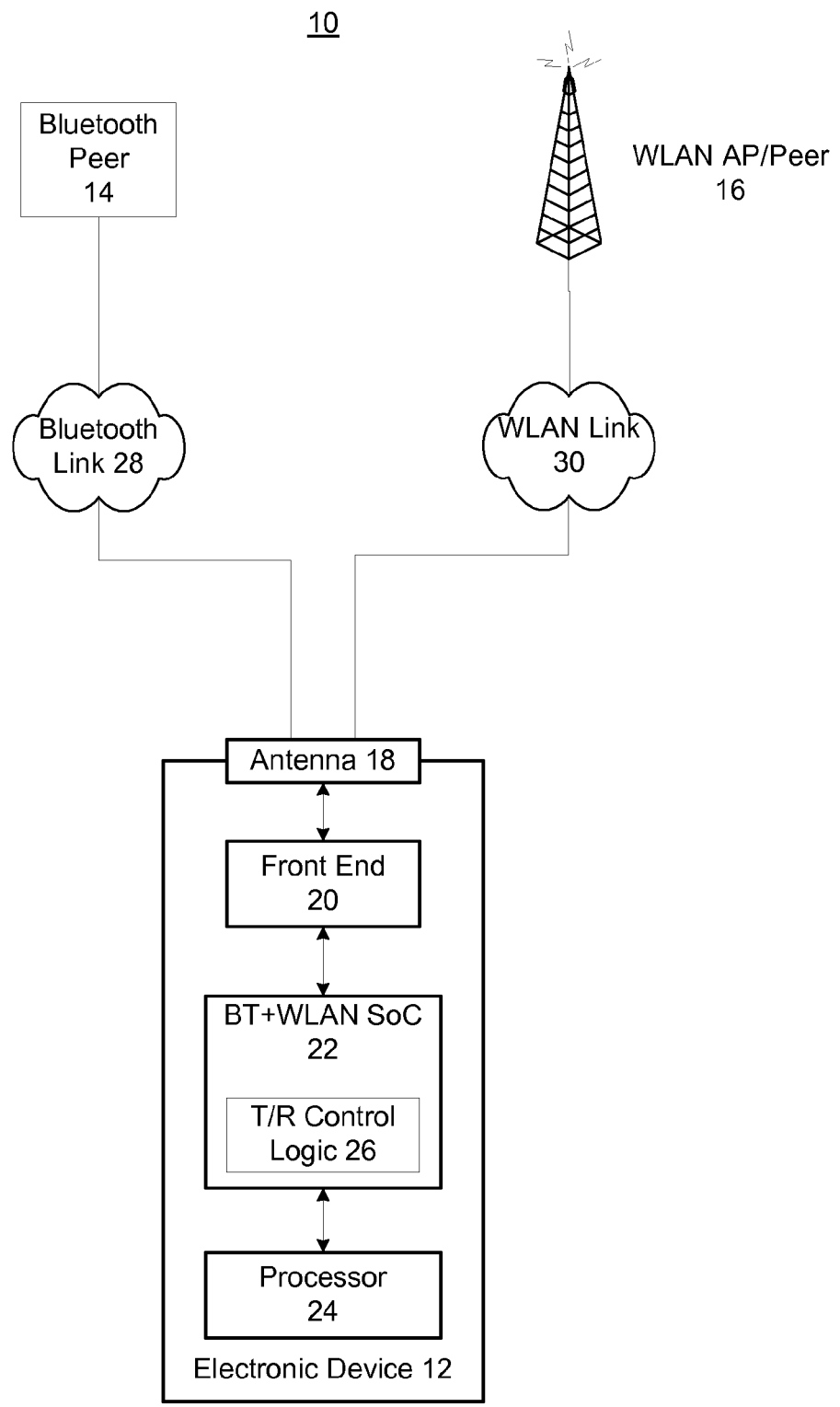
FIG. 1 illustrates an exemplary embodiment of a system architecture for coexistence of Bluetooth and WLAN in an electronic device.

FIG. 1 illustrates an exemplary embodiment of a system architecture for coexistence of Bluetooth and WLAN in an electronic device. The system 10 includes an electronic device 12, a Bluetooth peer 14 and a WLAN access point or peer (WLAN AP/peer) 16. Electronic device 12 may be any device operative to utilize both Bluetooth and WLAN transmissions and receptions. The electronic device 12 may be generally any portable, mobile, or hand-held wireless electronic device having Bluetooth and WLAN functionality collocated on the same device. Examples of such electronic devices include cellular handsets, battery-powered media players, portable gaming consoles, smartphones, personal digital assistants (PDAs) and ultra-low-power computing platforms.

The electronic device 12 may include an antenna 18, a radio frequency (RF) front-end 20, a Bluetooth and WLAN system-on-a-chip 22 (hereinafter referred to as SoC 22), and a host processor 24. The electronic device 12 can utilize a shared antenna 18 to maintain a Bluetooth link 28 with the Bluetooth peer 14, and to maintain a WLAN link 30 with the WLAN AP/peer 16. In other embodiments, more than one antenna can be used to provide the functionality of the antenna 18. The RF front-end 20 is coupled between the antenna 18 and the SoC 22, and the SoC 22 is coupled to the host processor 24.

In one embodiment, the RF front-end 20 and the SoC 22 may provide integrated Bluetooth baseband/RF and 802.11a/b/g WLAN for the electronic device 12. An example of the SoC 22 is a commercially available 802.11b/g 88W8688 WLAN/BT combo SoC from Marvell Semiconductor, Inc.

The SoC 22 acts a transceiver for both WLAN and Bluetooth. The SoC 22 can be connected to a host processor 24 using either a unified host interface or independent host interfaces for WLAN and Bluetooth connections.

The SoC 22 includes transmit/receive (T/R) control logic 26 that controls operation of the RF front-end 20 to permit substantially simultaneous transmitting and receiving of Bluetooth signals and WLAN signals, as described below. The T/R control logic 26 may be implemented as software, hardware, or a combination of both.

Figure 2:
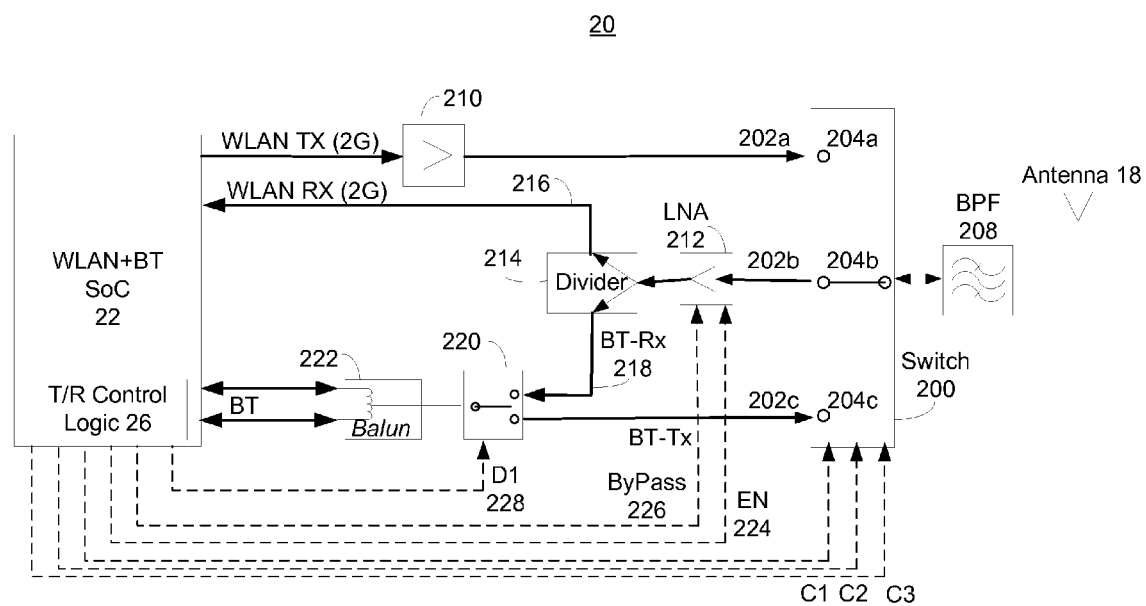
FIG. 2 is a block diagram illustrating a RF front-end architecture according to one embodiment

FIG. 2 is a block diagram illustrating the RF front-end architecture according to one embodiment, where like components from FIG. 1 have like reference numerals. Although the RF front-end architecture 20 is shown for use in electronic device 12 in conjunction with a SoC 22 transceiver, the RF front-end architecture 20 is also applicable to devices having other types of transceivers and collocated WLAN and Bluetooth devices.

In one exemplary embodiment, the RF front-end architecture 20 may include a switch 200, RF paths 202a, 202b and 202c, a band pass filter (BPF) 208. The band pass filter (BPF) 208 may be coupled between shared antenna 18 and the switch 200 and may function to filter input and output signals to a desired frequency bandwidth.

Paths 202a, 202b and 202c may be coupled between the SoC 22 and three transmit and receive (TX/RX) ports 204a, 204b and 204c of the switch 200. Path 202a and port 204a may be dedicated to the transmissions of WLAN signals (WLAN TX). Path 202b and port 204b may be dedicated to simultaneous receptions of the Bluetooth signals and the WLAN signals (BT-RX/WLAN RX). And Port 204c is shown dedicated to the transmission of Bluetooth signals only, but corresponding path 202c may be dedicated to 1) transmissions only of Bluetooth signals (BT-TX) when a WLAN link is active, and 2) transmissions and receptions of the Bluetooth signals (BT-RX) when the WLAN link is active and in a power save state, and when the WLAN link is inactive.

The switch 200 may control which of the three paths 202a, 202b and 202c to connect to the antenna 18. In one embodiment, the switch 200 may be implemented as a single pole triple throw switch (SP3T). The function of the switch 200 is controlled by signals C1, C2 and C3 from the T/R control logic 26 of the SoC 22. For example, C1 may cause the switch 200 to select port 204a, C2 may cause the switch 200 to select port 204b, and C3 may cause the switch 200 to select port 204c.

In one embodiment, the path 202a, which is dedicated to WLAN transmissions only, may include a power amplifier (PA) 210 that amplifies the WLAN transmissions. This boosts WLAN transmit power to the desired range.

In one embodiment, the path 202b may include an amplifier and a divider. In one embodiment, the amplifier comprises a low noise amplifier (LNA) 212, although a distributed amplifier could also be used, and the divider 214 comprises a RF divider. In one embodiment, the divider 214 may comprise a RF divider. The divider 214 allows the path 202b to receive WLAN signals as well as BT signals from the antenna 18, enabling the SoC 22 to receive the WLAN signals and the BT signals simultaneously in time. Since the incoming WLAN and BT receive signals suffer signal strength losses at the BPF 208, the switch 200, and the divider 214, the LNA 212 shared by the received Bluetooth and WLAN signals amplifies both of the signals to compensate for the loss of signal strength. The divider 214 splits the amplified Bluetooth and a WLAN signals output by the LNA 212 onto a WLAN receive path 216 and a Bluetooth receive path 218. The WLAN receive path 216 coupled to the SoC 22, while the Bluetooth receive path 218 is used an input of Path 202c for Bluetooth receptions. In one embodiment, the LNA 212 may amplify the received Bluetooth signals and the WLAN signals by approximately 14 dB, while the divider 214 may result in a loss of approximately a −3.5 dB on both the WLAN receive path 216 and a Bluetooth receive path 218.

In one embodiment, the LNA 212 may have two input controls, an enable (EN) signal 224 and a bypass signal 226, both originating from the T/R control logic 26. The enable signal 224 can both enable and disable the LNA 212, such that the LNA 212 can be switched OFF to reduce overall current consumption of the RF front-end 20 whenever Path 202b is not selected. The bypass signal 226 may cause the Bluetooth signals and WLAN signals to pass through the LNA 212 without amplification when Path 202b is selected, but no gain is required. This is to avoid over-saturation of the WLAN and Bluetooth receive paths 216 and 218 within the SoC 22.

Bluetooth signals of paths 202b and 202c are further multiplexed using a switch 220, such a single pole dual throw (SPDT) switch. The switch 220 selects the Bluetooth receive path 218 when the RF front-end 20 is receiving Bluetooth signals on path 202b, and selects the path 202c when the RF front-end 20 is transmitting Bluetooth signals. Signal D1 228 from the T/R control logic 26 controls the selection of the switch 220. Signal D1 228 may be replaced by two separate (or derived) signals from the SoC 22 because in the embodiment where the switch 220 comprises a SPDT switch, two discrete inputs are required, in which case, the other input to the switch could be a logical NOT of the first input in some cases.

The output of the switch 220 may be coupled to a balun 222, which in turn is coupled to the SoC 22. A balun joins a balanced line (one that has two conductors, with equal currents in opposite directions, such as a twisted pair cable) to an unbalanced line (one that has just one conductor and a ground, such as a coaxial cable). In one embodiment, the balun 222 may be used to improve Bluetooth signal quality entering the SoC 22.

In one embodiment, the path 202c serves three mutually exclusive functions. 1) When operating alongside the co-located WLAN AP/peer 16 and assuming an active WLAN link 30, the path 206 is dedicated for Bluetooth transmissions only. 2) When operating alongside the co-located WLAN AP/peer 16 and assuming an active WLAN link 30 but in power save state (i.e., a doze state), path 202c is dedicated for both Bluetooth transmissions and reception. 3) When operating alongside the co-located WLAN AP/peer 16 and assuming an inactive WLAN link 30 (e.g., WLAN is switched OFF in device 12), path 202c is used for Bluetooth transmissions as well as receptions.

The logic to switch the ports 204a, 204b, and 204c on the switch 200 is within the T/R control logic 26 of the SoC 22. This logic is configurable depending upon the type of Bluetooth traffic, the type of WLAN traffic, and on the individual state of each of the two collocated Bluetooth peer 14 and the WLAN AP/peer 16 devices. Table 1 shows a logical truth table that could be used to implement the control signals C1, C2, C3, and D1 during different WLAN and BT states, where X means does not matter.

TABLE 1

|  | WLAN TX BT awake | WLAN TX BT OFF | WLAN RX BT awake | WLAN RX BT OFF |
|---|---|---|---|---|
| C1 | 1 | 1 | 0 | 0 |
| C2 | 0 | 0 | 1 | 1 |
| C3 | 0 | 0 | 0 | 0 |
| D1 | X | X | X | X |
| Results | Path 202a | Path 202a | Path 202b | Path 202b |

The columns in Table 1 show which of the paths 202a, 202b, and 202c are used with the WLAN either transmitting (Tx) or receiving (Rx), and also with the collocated Bluetooth device 14 in either an Awake or a turned Off state simultaneously.

TABLE 2

|  | BT TX WLAN awake | BT TX WLAN sleep | BT TX WLAN OFF | BT RX WLAN awake | BT RX WLAN sleep | BT RX WLAN OFF |
|---|---|---|---|---|---|---|
| SP3T C1 | 0 | 0 | 0 | 0 | 0 | 0 |
| SP3T C2 | 0 | 0 | 0 | 1 | 0 | 0 |
| SP3T C3 | 1 | 1 | 1 | 0 | 1 | 1 |
| SPDT D1 | 1 | 1 | 1 | 0 | 1 | 1 |
| Results | Path 202c | Path 202c | Path 202c | Path 202b | Path 202c | Path 202c |

Similarly, Table 2 shows which of the paths 202b, and 202c are used when Bluetooth is transmitting (Tx) or receiving (Rx) and with the WLAN AP/peer 16 in either the Awake, Sleep or turned Off state. Awake states in the above two tables mean idle; in other words, the collocated device is powered up but is not maintaining an active link with any nearby device.

Table 3 shows possible examples of port transitions in switch 200. In this table, both WLAN and Bluetooth are in their respective Awake states. The transitions occur only when the SoC 22 decides to move between paths. For example, the first port transition is a transition from Bluetooth transmit to WLAN transmit. The reverse transitions also apply accordingly in the reverse direction for all the shown combinations.

TABLE 3

|  | BT_TX → WL_TX | BT_RX → WL_TX | WL_RX → BT_TX | WL_RX → WL_TX | BT_TX → BT_RX | WL_RX → BT_RX |
|---|---|---|---|---|---|---|
| SP3T C1 | 0 −> 1 | 0 −> 1 | 0 −> 0 | 0 −> 1 | 0 −> 0 | 0 −> 0 |
| SP3T C2 | 0 −> 0 | 1 −> 0 | 1 −> 0 | 1 −> 0 | 0 −> 1 | 1 −> 1 |
| SP3T C3 | 1 −> 0 | 0 −> 0 | 0 −> 1 | 0 −> 0 | 1 −> 0 | 0 −> 0 |
| SPDT D1 | 1 −> X | X −> X | X −> 1 | X −> X | 1 −> 0 | X −> 0 |
| Results | Path 202c to Path 202a | Path 202b to Path 202a | Path 202b to Path 202c | Path 202b to Path 202a | Path 202c to Path 202b | Path remains on 202b |

Below describes additional points about switch transitions. In one embodiment, there are no switch transitions for Bluetooth receive to WLAN receive, and for WLAN receive to Bluetooth receive. This enables simultaneous WLAN receive and Bluetooth RX, i.e., on-going receptions on one of these two paths 204a or 202c will not be interrupted due to a higher priority receptions expected on the other path. In one embodiment, the default state of the switch 200 is Path 202b. Thus, the switch 200 will switch to Path 202b if there are no other pending requests for transmissions or receptions.

A Bluetooth and WLAN coexistence architecture using a shared LNA has been disclosed. The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, and is to be executed by a processor. Accordingly, many modifications may be made without departing from the scope of the appended claims.

What is claimed is:

1. A radio frequency (RF) front-end comprising:
a first path coupled between an antenna and a transceiver, wherein the first path is configured to convey WLAN signals from the transceiver to the antenna for transmission;
a second path coupled between the antenna and the transceiver, wherein
the second path is configured to convey received Bluetooth signals and received WLAN signals from the antenna to the transceiver,
the second path includes an amplifier coupled between the antenna and a divider,
the amplifier (i) is shared by received Bluetooth signals and received WLAN signals and (ii) is configured to output amplified Bluetooth signals and amplified WLAN signals,
the amplifier is configured to at least one of (i) be switched off when the second path is not selected, or (ii) pass the received Bluetooth signals and the received WLAN signals without amplification when the second path is selected but no gain is required, and
the divider splits the amplified Bluetooth signals and the amplified WLAN signals onto a WLAN receive path and a Bluetooth receive path; and
a third path coupled between the antenna and the transceiver, wherein the third path is configured to
convey Bluetooth signals from the transceiver to the antenna for transmission when a WLAN link is (i) active and (ii) not in a power save state, and
convey (a) received Bluetooth signals from the antenna to the transceiver, and (b) Bluetooth signals from the transceiver to the antenna for transmission, when the WLAN link is either (i) inactive or (ii) in the power save state.

2. The RF front-end of claim 1, further comprising a switch coupled between (i) the antenna and the first path, (ii) the antenna and the second path, and (iii) the antenna and the third path, wherein the switch controls which of the first path, the second path, and the third path connects to the antenna.

3. The RF front-end of claim 1, wherein the amplifier includes a low noise amplifier.

4. The RF front-end of claim 1, wherein the WLAN receive path is coupled to the transceiver, and wherein the Bluetooth receive path is coupled to an input to the third path.

5. The RF front-end of claim 1, wherein the amplifier receives an enable signal originating from the transceiver, and wherein the amplifier is configured to be switched off, responsive to the enable signal, to reduce current consumption of the RF front-end when the second path is not selected.

6. The RF front-end of claim 1, wherein the amplifier receives a bypass signal originating from the transceiver, and wherein the received Bluetooth signals and the received WLAN signals are configured to pass through the amplifier, responsive to the bypass signal, without amplification when (i) the second path is selected and (ii) no gain is required.

7. The RF front-end of claim 1, wherein the second path and the third path are multiplexed using another switch that:
selects the Bluetooth receive path when the RF front-end is conveying received Bluetooth signals from the antenna to the transceiver on the second path; and
selects the third path when the RF front-end is conveying Bluetooth signals to the antenna for transmission.

8. A method for facilitating Bluetooth and WLAN transmissions and receptions via a radio frequency (RF) front-end, wherein the RF front-end comprises (i) a first path coupled between an antenna and a transceiver, (ii) a second path coupled between the antenna and the transceiver, and (iii) a third path coupled between the antenna and the transceiver, the method comprising:
conveying, over the first path, WLAN signals from the transceiver to the antenna for transmission;
conveying, over the second path, received Bluetooth signals and received WLAN signals from the antenna to the transceiver, wherein
the second path comprises an amplifier coupled between the switch and a divider,
the amplifier (i) is shared by received Bluetooth signals and received WLAN signals and (ii) outputs amplified Bluetooth signals and amplified WLAN signals,
the amplifier is configured to at least one of (i) be switched off when the second path is not selected, or (ii) pass the received Bluetooth signals and the received WLAN signals without amplification when the second path is selected but no gain is required, and
the divider splits the amplified Bluetooth signals and the amplified WLAN signals onto a WLAN receive path and a Bluetooth receive path; and
conveying, over the third path,
Bluetooth signals from the transceiver to the antenna for transmission when a WLAN link is (i) active and (ii) not in a power save state, and
(i) received Bluetooth signals from the antenna to the transceiver, and (ii) Bluetooth signals from the transceiver to the antenna for transmission, when the WLAN link is either (i) inactive or (ii) in the power save state.

9. The method of claim 8, wherein the RF front-end further comprises a switch coupled between (i) the antenna and the first path, (ii) the antenna and the second path, and (iii) the antenna and the third path, wherein the switch controls which of the first path, the second path, and the third path connects to the antenna.

10. The method of claim 8, wherein the amplifier is a low noise amplifier.

11. The method of claim 8, wherein:
the WLAN receive path is coupled to the transceiver; and
the Bluetooth receive path is coupled to an input to the third path.

12. The method of claim 8, further comprising providing an enable signal to the amplifier, wherein the amplifier is configured to be switched off, responsive to the enable signal, to reduce current consumption when the second path is not selected.

13. The method of claim 8, further comprising providing a bypass signal to the amplifier, wherein the received Bluetooth signals and the received WLAN signals are configured to pass through the amplifier, responsive to the bypass signal, without amplification when the second path is selected and no gain is required.

14. The method of claim 8, further comprising multiplexing the second path and the third path using another switch that (i) selects the Bluetooth receive path when the RF front-end is conveying received Bluetooth signals from the antenna to the transceiver on the second path and (ii) selects the third path when the RF front-end is conveying Bluetooth signals to the antenna for transmission.

15. A radio frequency (RF) front-end comprising:
a first path coupled between an antenna and a transceiver, the first path configured to convey WLAN signals from the transceiver to the antenna for transmission;
a second path coupled between the antenna and the transceiver, wherein
the second path is configured to convey received Bluetooth signals and received WLAN signals from the antenna to the transceiver when a WLAN link is (i) active and (ii) not in a power save state, and
the second path is also selected during a default state in which there are no pending requests for transmissions or receptions; and
a third path coupled between the antenna and the transceiver, wherein the third path is configured to
convey Bluetooth signals from the transceiver to the antenna for transmission when the WLAN link is (i) active and (ii) not in the power save state, and
convey (a) received Bluetooth signals from the antenna to the transceiver, and (b) Bluetooth signals from the transceiver to the antenna for transmission, when the WLAN link is either (i) inactive or (ii) in the power save state.

16. The RF front-end of claim 15, wherein:
the second path includes an amplifier coupled between the antenna and a divider;
the amplifier (i) is shared by received Bluetooth signals and received WLAN signals and (ii) is configured to output amplified Bluetooth signals and amplified WLAN signals;
the amplifier is configured to at least one of (i) be switched off when the second path is not selected, or (ii) pass the received Bluetooth signals and the received WLAN signals without amplification when the second path is selected but no gain is required; and
the divider splits the amplified Bluetooth signals and the amplified WLAN signals onto a WLAN receive path and a Bluetooth receive path.

17. The RF front-end of claim 16, wherein the WLAN receive path is coupled to the transceiver, and wherein the Bluetooth receive path is coupled to an input to the third path.

18. The RF front-end of claim 15, further comprising a switch coupled between (i) the antenna and the first path, (ii) the antenna and the second path, and (iii) the antenna and the third path, wherein the switch controls which of the first path, the second path, and the third path connects to the antenna.

19. A method for facilitating Bluetooth and WLAN transmissions and receptions via a radio frequency (RF) front-end, wherein the RF front-end comprises (i) a first path coupled between an antenna and a transceiver, (ii) a second path coupled between the antenna and the transceiver, and (iii) a third path coupled between the antenna and the transceiver, the method comprising:
conveying, over the first path, WLAN signals from the transceiver to the antenna for transmission;
conveying, over the second path, received Bluetooth signals and received WLAN signals from the antenna to the transceiver when a WLAN link is (i) active and (ii) not in a power save state, wherein the second path is also selected during a default state in which there are no pending requests for transmissions or receptions; and
conveying, over the third path,
Bluetooth signals from the transceiver to the antenna for transmission when the WLAN link is (i) active and (ii) not in the power save state, and
(i) received Bluetooth signals from the antenna to the transceiver, and (ii) Bluetooth signals from the transceiver to the antenna for transmission, when the WLAN link is either (i) inactive or (ii) in the power save state.

20. The method of claim 19, wherein:
the second path comprises an amplifier coupled between the switch and a divider;
the amplifier (i) is shared by received Bluetooth signals and received WLAN signals and (ii) outputs amplified Bluetooth signals and amplified WLAN signals;
the amplifier is configured to at least one of (i) be switched off when the second path is not selected, or (ii) pass the received Bluetooth signals and the received WLAN signals without amplification when the second path is selected but no gain is required; and
the divider splits the amplified Bluetooth signals and the amplified WLAN signals onto a WLAN receive path and a Bluetooth receive path.

21. The method of claim 20, wherein:
the WLAN receive path is coupled to the transceiver; and
the Bluetooth receive path is coupled to an input to the third path.

* * * * *